(12) United States Patent
Fisher

(10) Patent No.: US 12,093,951 B1
(45) Date of Patent: Sep. 17, 2024

(54) SYSTEMS AND METHODS FOR VERIFICATION AND ENABLEMENT OF FINANCIAL INSTRUMENTS

(71) Applicant: United Services Automobile Association (USAA), San Antonio, TX (US)

(72) Inventor: Jon Fisher, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 76 days.

(21) Appl. No.: 16/842,445

(22) Filed: Apr. 7, 2020

Related U.S. Application Data

(60) Provisional application No. 62/837,072, filed on Apr. 22, 2019.

(51) Int. Cl.
*G06Q 20/40* (2012.01)
*G06F 16/182* (2019.01)
*G06Q 20/38* (2012.01)
*H04L 9/06* (2006.01)

(52) U.S. Cl.
CPC ....... *G06Q 20/401* (2013.01); *G06F 16/1837* (2019.01); *G06Q 20/3821* (2013.01); *H04L 9/0637* (2013.01)

(58) Field of Classification Search
None
See application file for complete search history.

(56) References Cited

U.S. PATENT DOCUMENTS

| | | | |
|---|---|---|---|
| 10,805,090 B1 * | 10/2020 | Poelstra | H04L 9/50 |
| 11,038,685 B1 * | 6/2021 | Dennis | H04L 9/3239 |
| 11,487,713 B1 * | 11/2022 | Fisher | G06Q 50/26 |
| 11,522,700 B1 * | 12/2022 | Auerbach | H04L 9/3213 |
| 2017/0053249 A1 * | 2/2017 | Tunnell | G09C 5/00 |
| 2019/0180276 A1 * | 6/2019 | Lee | H04L 9/3247 |
| 2019/0180291 A1 * | 6/2019 | Schmeling | G16H 20/10 |
| 2020/0118068 A1 * | 4/2020 | Turetsky | G06F 9/45558 |
| 2020/0134656 A1 * | 4/2020 | Padmanabhan | H04L 9/0637 |
| 2020/0269511 A1 * | 8/2020 | Vasil | G06F 21/64 |
| 2022/0253842 A1 * | 8/2022 | James | H04L 9/50 |

* cited by examiner

*Primary Examiner* — Chrystina E Zelaskiewicz
(74) *Attorney, Agent, or Firm* — Fletcher Yoder, P.C.

(57) ABSTRACT

Techniques are described for receiving a whitelist record, the whitelist record comprising a date, a time, or a combination. The techniques include determining whether a transaction is valid based on the whitelist record. The techniques further include processing the transaction in response to the transaction being valid based on the whitelist record and storing the transaction in response to the transaction being determined to be valid.

16 Claims, 4 Drawing Sheets

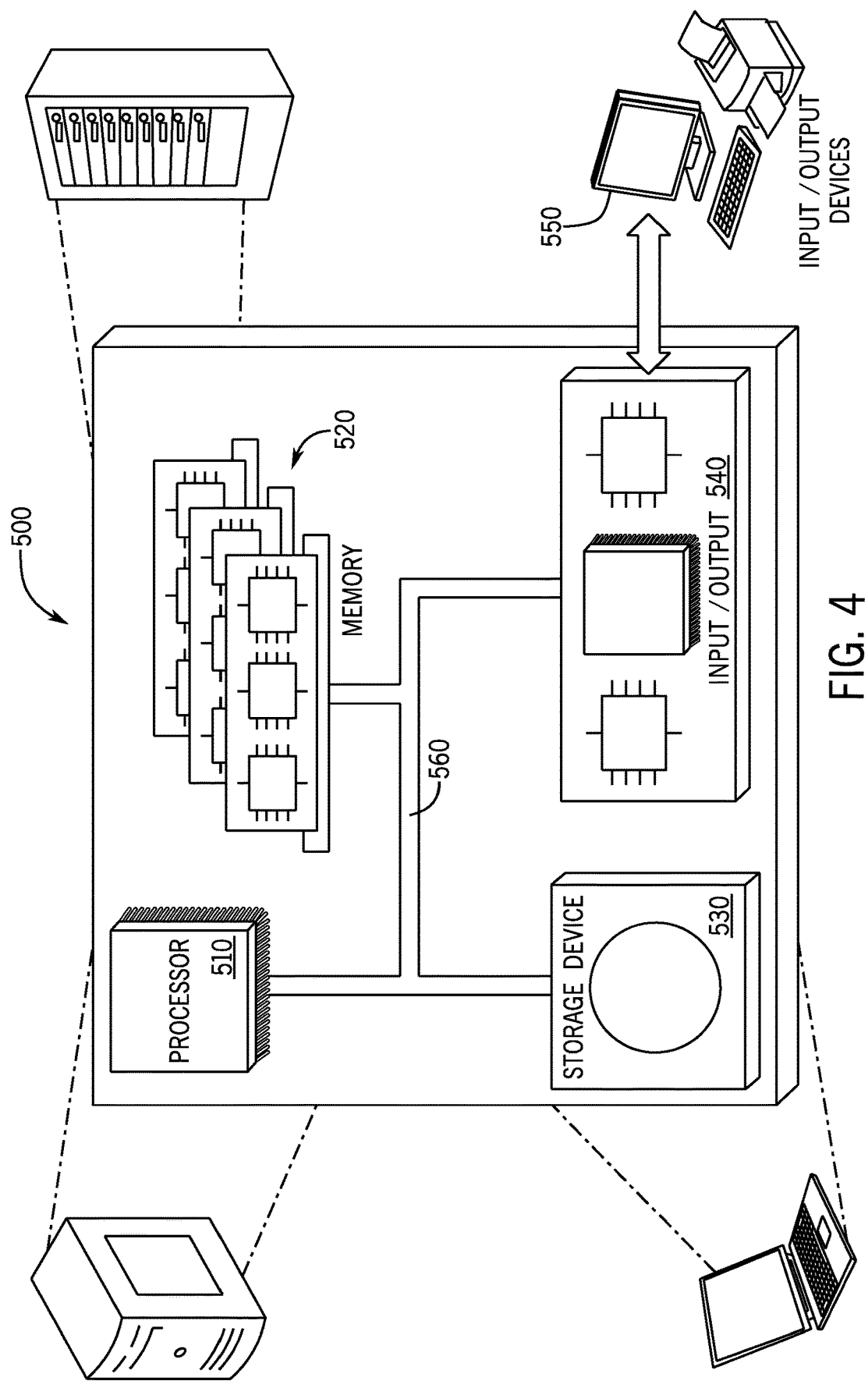

SYSTEMS AND METHODS FOR VERIFICATION AND ENABLEMENT OF FINANCIAL INSTRUMENTS

CROSS REFERENCE TO RELATED APPLICATIONS

This application claims priority to U.S. Provisional Patent Application No. 62/837,072, entitled "Systems and Methods for Verification and Enablement of Financial Instruments," filed Apr. 22, 2019, which is herein incorporated by reference in its entirety for all purposes.

BACKGROUND

The present disclosure relates generally to financial instruments, and more particularly to systems and methods for verification and enablement of financial instruments.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Various entities, including users of retail systems may engage in various retail transactions. For example, a person or entity (e.g. corporation) may use a debit card system, a credit card system, and the like, to purchase various items and services. Each transaction typically results in an authentication process to enable the transaction and the movement of funds from the buyer to the seller. The techniques described herein may provide for improvement in systems and methods for the enablement financial instruments, and for the verification of certain transactions.

BRIEF DESCRIPTION

The techniques described herein are generally directed at applying "whitelisted" timeframes and/or verification interactions to improve transactional security. For example, a financial transaction may involve a buyer (e.g., initiating party), a seller (e.g., beneficiary party), and a transaction service provider (e.g., credit card processor) that would enable the financial transaction. The buyer may initiate a transaction to purchase goods from a seller for a certain price. The transaction service provider may first verify the seller, for example, through a credit card chip ID, through a signature on a check, and so on, and then transfer funds from the buyer to the seller. The techniques described herein may only enable the transaction to take occur based information received a priori to the transaction. For example, the seller, the buyer, or both, may set up a time range at which the transaction should take place. If the credit card is used outside of the selected time range, then the transaction would not be authorized. In another embodiment, a buyer may take a picture of a check that is being used for a purchase. For example, after writing the check, the buyer would take a picture and separately submit the picture to the transaction processor (e.g., bank). If a check is received at the bank without a respective picture submission, the check would be considered invalid. In yet another embodiment, a health information record update would only be transmitted after a medical procedure takes place.

In some embodiments, the whitelist and/or verification interactions may be stored and/or communicated via a distributed ledger-based system that creates and manages immutable trails of documents and/or transactions that may more efficiently provide for certain audit and verification records. A distributed ledger, such as a blockchain, may thus be used to provide an immutable or otherwise unchangeable record of certain documents and transactions related to or including the whitelisted timeframes and/or verification interactions. The distributed ledger may further provide for crypto security features and for records that may be verified to provide for enhanced security and trust. Additionally, certain transactions may be automatically stored, signed and updated through blockchain techniques, eliminating middlemen and providing for enhanced transactional efficiencies.

In a first embodiment, a system includes a first processor and a first memory communicatively coupled to the first processor. The memory stores instructions which, when executed, cause the first processor to perform operations including receiving a whitelist record, the whitelist record comprising a date, a time, or a combination thereof. The instructions further cause the first processor to perform operations including determining whether a transaction is valid based on the whitelist record, processing the transaction in response to the transaction being valid based on the whitelist record, and storing the transaction in response to the transaction being determined to be valid.

In a second embodiment, a method performed by at least one processor includes receiving, via the at least one processor, a whitelist record, the whitelist record comprising a date, a time, or a combination thereof. The method further includes determining whether a transaction in response to being valid based on the whitelist record. The method additionally includes processing the transaction in response to the transaction being valid based on the whitelist record and storing the transaction in response the transaction being determined to be valid.

In a third embodiment, one or more non-transitory computer-readable storage media, is provided, the media storing instructions which, when executed, cause at least one processor to perform operations including receiving a whitelist record, the whitelist record comprising a date, a time, or a combination thereof. The instructions further cause the at least one processor to perform operations including determining whether a transaction is valid based on the whitelist record, processing the transaction in response to the transaction being valid based on the whitelist record, and storing the transaction in response to the transaction being determined to be valid.

In general, implementations of innovative aspects of the subject matter described in this specification can be embodied in the creation of whitelisted timeframes and/or verification interactions suitable for improving information security and privacy. The whitelisted timeframes and verification interactions may be used alone or in combination to provide for multiple levels of transactional authentication when processing financial transactions, insurance transactions, health-based transactions, and so on. The whitelisted timeframes may provide for times at which certain transactions are enabled, as well as times at which certain transactions are disabled. Transactions occurring during the desired times may then be authorized or may be blocked, as desired. Verification transactions, such as submitting a check picture as verification that the check should be processed, may additionally or alternatively be used to improve authentication processes that verify the authenticity of certain transactions. The transactions may, in certain embodiments, be included in a digital distributed ledger system, for example, for auditing purposes.

The implementations described herein provide at least the following technical advantages and/or improvements compared to previously available techniques. Through use of whitelisted timeframes and verification interactions, the techniques described herein may provide for increased security and authentication. Using digital distributed ledgers for storing certain of the whitelisted timeframes and/or verification interactions may be automated and made more efficient and less costly. Security trails may be created, which may provide for immutable evidence of certain stored records and transaction. Accordingly, the digital distributed ledger implementations may provide an inexpensive, reliable, secure mechanism for storing and sharing receipt information, thus making efficient use of processing power, memory, storage space, network bandwidth, and/or other computing resources.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIG. 4 depicts an example computing system, according to aspects of the present disclosure.

DETAILED DESCRIPTION

Figure 1:
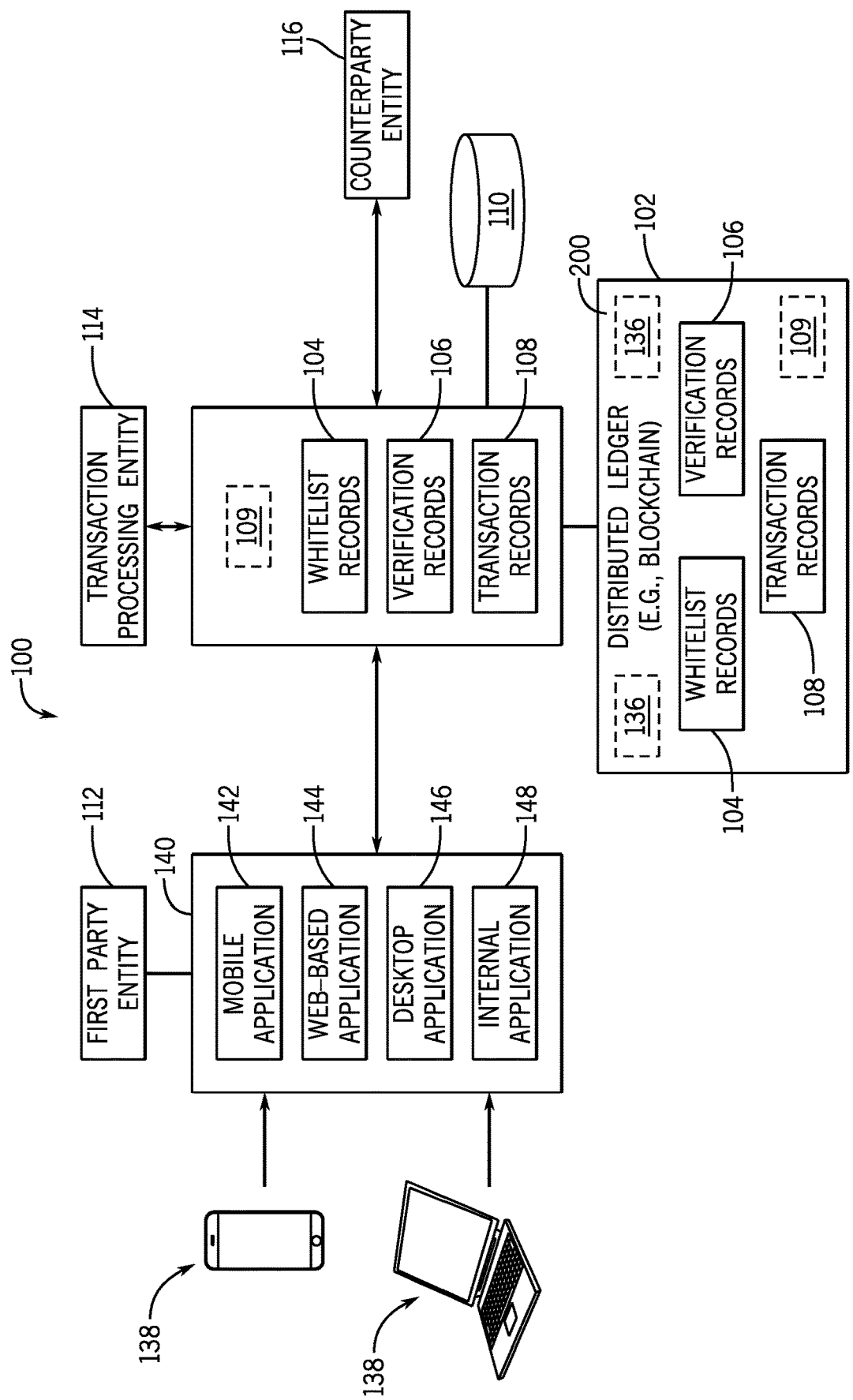
FIG. 1 depicts an embodiment of a system for whitelist and/or verification trail creation and management, according to aspects of the present disclosure.

Embodiments of the present disclosure are directed to systems, devices, methods, and computer-readable media for creating, maintaining, and tracking whitelisted timeframes and verification interaction information. In some embodiments, the whitelisted timeframes and verification interaction information may be implemented using a distributed ledger, resulting in one or more security trails. A whitelisted trail may include information, such as documents used to verify a financial transaction before and/or after the financial transaction takes place. For example, a time range may be input by a credit card user and credit card purchases may then only be authorized to occur during the time range. Likewise, a picture of a check may be transmitted after the check is signed, and the digital check image must be received in order for the funds to be allocated.

Information on whitelists, verification information, and/or associated transactions may be stored in trails to be tracked using a distributed ledger system, such as a system that includes one or more blockchains. The blockchain(s) provide immutable and secure data storage, which may be distributed across a plurality of computing systems or nodes. As new information is generated (e.g., new whitelists, verification information, and/or associated transactions), the new information may be included in the distributed ledger system, thus "growing" the trails throughout the lifetime of the entity (e.g., client) being tracked. The distributed ledger system, such as one or more blockchains, may be used to store the information, including new information, more efficiently and inexpensively. The distributed ledger system may also provide enhanced security, such that only authorized individuals and/or processes can access the data stored on the distributed ledger system. The distributed ledger system may also provide immutability, such that data records written to the distributed ledger may not be changed or removed once written.

The blockchain may grow as new blocks are added based on a new set of information (e.g., new whitelists, verification information, and/or associated transactions). In some examples, a single block is derived from multiple information, such as from a whitelist and the associated transactions (e.g., financial transactions) that used the whitelist. In general, blocks are added to the blockchain in a linear, chronological order by one or more computing devices in a peer-to-peer network of interconnected computing devices that execute a blockchain protocol. The peer-to-peer network may be described as a plurality of interconnected nodes, each node being a computing device that uses a client to validate and to relay transactions to other nodes. Each node may maintain a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous blockchain transactions to validate a requested transaction, all entities should agree on which transactions have actually occurred, and in which order. For example, should two entities observe different transaction histories, they will be unable to come to the same conclusion regarding the validity of a transaction. The blockchain techniques described herein enable all entities to come to an agreement as to transactions that have already occurred, and in which order. As described in further detail below, a ledger of trails is agreed to based on the amount of work (e.g., computing work such as hashing) required to add a transaction to the ledger (e.g., add a block to the blockchain). Blockchains may also employ other protocols, for example, that may define "work" differently. The work may be a computing task that may be difficult for any single node (e.g., computing device) in the peer-to-peer network to complete quickly, but is relatively easy for any node (e.g., computing device) to verify.

The peer-to-peer network may include multiple "miners" (e.g., computing devices) that add blocks to a blockchain based on the blockchain protocol. In general, multiple miners validate transactions that are to be added to a block, and compete (e.g., perform computing work, as introduced above) to have their respective block added to the blockchain. Validation of transactions includes verifying digital signatures associated with respective transactions. For a block to be added to the blockchain, a miner must demonstrate a proof of work before their proposed block of transactions is accepted by the peer-to-peer network, and before the block is added to the blockchain. In certain embodiments, a blockchain protocol include a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value such that the output hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a "nonce" value (e.g., a random number used only once).

Multiple nodes may compete to hash a set of transactions and to provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. If the hash value meets the threshold hash (e.g., at least the first four characters of the hash value are each zero), the respective miner may have successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner produces hundreds of thousands (or more) of hash values, before any one miner provides a qualifying hash value (e.g., at least the first four characters of the hash value are each zero).

In some embodiments, the distributed ledger or blockchain system can include one or more sidechains. A sidechain may be described as a blockchain that validates data from other blockchains. In some examples, a sidechain may provide for granularity of information so that different information "types", (e.g., whitelists, verification information, and/or associated transactions, and so on) may be stored in a different sidechain linked to a main chain. The blockchain may be a public blockchain, such that data stored on the blockchain is generally accessible. The blockchain or portions of the blockchain may alternatively or additionally be a private blockchain, such that the stored data is accessible only to authorized individuals and/or processes on the blockchain. By providing for whitelists, verification information, and/or associated transactions via blockchains, as further described below, enhanced transactional efficiencies, security, and information flows may be provided.

FIG. 1 depicts an embodiment of a whitelist transaction system 100 for whitelist and/or verification trail creation and tracking, according to aspects of the present disclosure. As shown in the example of FIG. 1, the whitelist transaction system 100 may include a distributed ledger system 102 that may include one or more blockchains. The distributed ledger system 102 may be hosted on any suitable number of computing devices that operate as nodes for the distributed ledger system 102. Such nodes may be geographically distributed in any suitable number of locations.

The distributed ledger system 102 may store any appropriate number of data records of various types, including whitelist trail records 104 and/or verification trail records 106. The whitelist trail records 104 may, in turn, include information related to whitelisting that may be desired during certain transactions, such as dates, times, purchase types (e.g., goods or services that may be purchased, or that may not be purchased), purchase amounts, or a combination thereof. The verification trail records 106 may include information such as images or pictures of objects, such as checks, pictures of credit cards, authentication codes (e.g., one-time use codes, multiple use codes), and the like, that may be used to verify that a transaction (e.g., financial transaction such as purchase, a money transfer, a refund, and so on; a banking transaction, an insurance transaction, a health records transaction, and the like) may be authorized to occur.

The distributed ledger system 102 may also include transaction trail records 108. The transaction trail records 108 may include transactions that use either the whitelist trail records 104 and/or the verification trail records 106. That is, transactions, such as financial transactions (e.g., purchases, sales, money transfers, loan payments), banking transactions (e.g., deposits, withdrawals, transfers), insurance transactions (e.g., purchases, policy updates), property transactions (e.g., deed recordings, transfers, payments), health transactions (e.g., doctor's visit records, payments, procedures performed), and so on, may be captured in the transaction trail records 108. The transaction trail records 108 may include transactions that were "executed" or "went through," e.g., transactions that were successful, as well as transactions that were not successful, for example, because of whitelisting and/or verification resulting in stopping the transaction. It is also to be noted that the whitelist trail records 104, the verification trail records 106, and/or the transaction trail records 108 may be stored in a database, such as a relational database 110, or in any other data storage system.

Each of the trail records 104, 106, 108 may include entity verification information that identifies a particular entity, such as an individual, a corporation, a club, and so on, participating in the transactions 108. For example, unique identification, such as cryptographic key(s), certificates of trust, government identification (e.g., driver's license, passport) and the like, may be used to uniquely identify parties involved in the transaction 108. The entity verification information may include information to identify service providers, such as service provider records. The service providers may include health service providers (e.g., doctors, dentists, nurses, nutritionist, and so on), financial services provides (e.g., banks, investment counselors, and the like), insurance service providers (e.g., insurance sellers, brokers, agents, and the like), other service providers (e.g., any of a variety of service providers, such as hairstylists, tour guides, pet groomers, consultants, and so on). Other party records may store any other party that was part of the purchase transaction, including house inspectors, mortgage brokers, banking entities, insurance entities, and so on.

In some embodiments, the distributed ledger system 102 may include a main blockchain 200 and one or more sidechains 136 that are linked to the main blockchain 200. In some embodiments, a sidechain 136 may be used to store certain record types. For example, a whitelist trail sidechain 136 may store only whitelist trail records 104. Likewise, a verification trail sidechain 136 may store only verification records 106. Similarly, sidechains 136 may be used to store transaction trail records 108. By using sidechains 136 dedicated to specific trail types 104-108, the techniques described herein may enable a more efficient record allocation in the distributed ledger 102. Further, in some embodiments, a side chain may be managed by various entities, for example, side chains 136 may be managed by multiple parties, such as a first party entity 112, a transaction processing entity 114, and/or a counterparty entity 116. The first party entity may be a buyer, such as a credit card holder, and the counterparty entity 116 may be the party counter to the buyer, such as a seller. The first party entity 112 may present the credit card to the counterparty entity 116, which may then use the transaction processing entity 114 to process the sale. Accordingly, transactions, such as sales, property transfers, insurance contracts, payments for doctor's visits, and so on, may be typically initiated by the first party 112, and the counterparty entity 166 may then be a beneficiary. The transaction processing entity 114 may then process the transaction.

For example, the transaction processing entity 114 may use the whitelists trail records 104, the verification trail records 106, or both to validate that the transaction was indeed intended by the first party entity 112, the counterparty entity 116, or by both. After the determination is made that the transaction is valid, the transaction may go through and be stored as a bona fide transaction record 108. If a determination is made that the transaction should not proceed based on the whitelists trail records 104, the verification trail records 106, or both, the transaction may still be recorded as a failed transaction 108. Accordingly, a record of valid and/or failed transactions 108 may be kept, along with documentation (e.g., records 104, 106) specifying why the transaction went through or was stopped. The entities 112, 114, and/or 116 may include individuals, clubs, banks, mortgage broker entities, credit card processing entities, agencies such as deed records, property records, and so on.

One or more computing devices 138 may have access to the distributed ledger system 102. In some instances, the computing devices 138 may be nodes that host a portion of the distributed ledger. Alternatively, the distributed ledger may be hosted on computing device(s) other than the computing devices 138. The computing devices 138 may include any suitable type of computing device, including portable computing devices (e.g., smartphone, tablet computer, wearable computer, etc.), workstations, desktop computers, servers, and so on. The computing devices execute certain applications 140. The applications 140 may include mobile applications 142 suitable for execution by mobile devices 138, web-based applications 144 that provide for a web interface, desktop applications 146 that may execute as native (e.g., operating system specific applications), and/or internal applications 148. The applications 140 may provide for techniques to enter whitelists trail records 104, verification trail records 106, and/or transaction records 108. For example, a picture of a check may be taken (e.g., via cell phone camera) and then the applications 140 may convert the scanned data into verification trail records 106. Likewise, the applications 140 may be used to transmit dates, times, and so on, as whitelist records 104 determining when transactions should (or should not) go through.

In certain embodiments, whitelists trail records 104 and/or verification trail records 106 may be communicated via email (e.g., emailed check pictures), by wireless techniques (e.g., via Bluetooth communication, via Wi-Fi transmission and the like), by wired techniques, and the like, as well as through manual data entry. Templates may be used so that, for example, whitelists trail records 104, verification trail records 106 for certain vendors having a known structure (e.g., header identifying vendor information, fields when to buy/sell, and so on) may be automatically decoded by the applications 140 without user input and then transformed into the whitelists trail records 104 and/or verification trail records 106. Additionally, some point of sale terminals may transmit data through wireless or wired techniques and the data may then be processed by the applications 140 via authorization from the first entity 112 and translated into the whitelists trail records 104 and/or verification trail records 106automatically. In certain embodiments, the applications 140 may be operatively coupled to the data repositories 110 to store and/or to extract information to create and/or grow the trails of the record 104, 106, 108.

The applications 140 may also provide for the creation and/or updating of entity verification information 109. For example, an individual user may enter their personal information to then be stored as encrypted records 109. Likewise, information identifying retail stores, service providers, and/or other parties involved in purchase transactions may be input via the applications 140 and stored in the records 109. Use of a distributed ledger-based system 102 (e.g., blockchain system) provides for records 104-108 creation and maintenance that is fast, inexpensive, ubiquitous, secure, and immutable. Accordingly, use of the distributed ledger system enables implementations to forego the need for a middleman that may act as a broker of certain information. The records 104-108 and entity verification information 109, once written, will remain part of the distributed ledger and be retrievable at any time. Indeed, the records 104-108 may only grow, and thus provide for an immutable, time-based view of the information stored therein. Accordingly, embodiments enable the records 104-108 to be stored on the distributed ledger 102 in a manner that is more secure, immutable, and readily accessible (e.g., auditable) than traditional files stored in vulnerable paper form at banks, escrow agencies, investment agencies, insurance agencies, and so on. It is also to be noted that the distributed ledger 102 may be stored in hardware, thus providing for a hardware-based system. For example, the hardware may include a universal serial bus (USB) drive that may store encrypted data, and that may include secure techniques to access the distributed ledger 102 stored therein. The records 104-108 and the entity verification information 109 may be provided to certain external entities, for example, for audit purposes, for regulatory purposes, and so on. External entities may include private auditors, governmental entities (e.g., tax processing entities), public entities, and so on.

Figure 2:
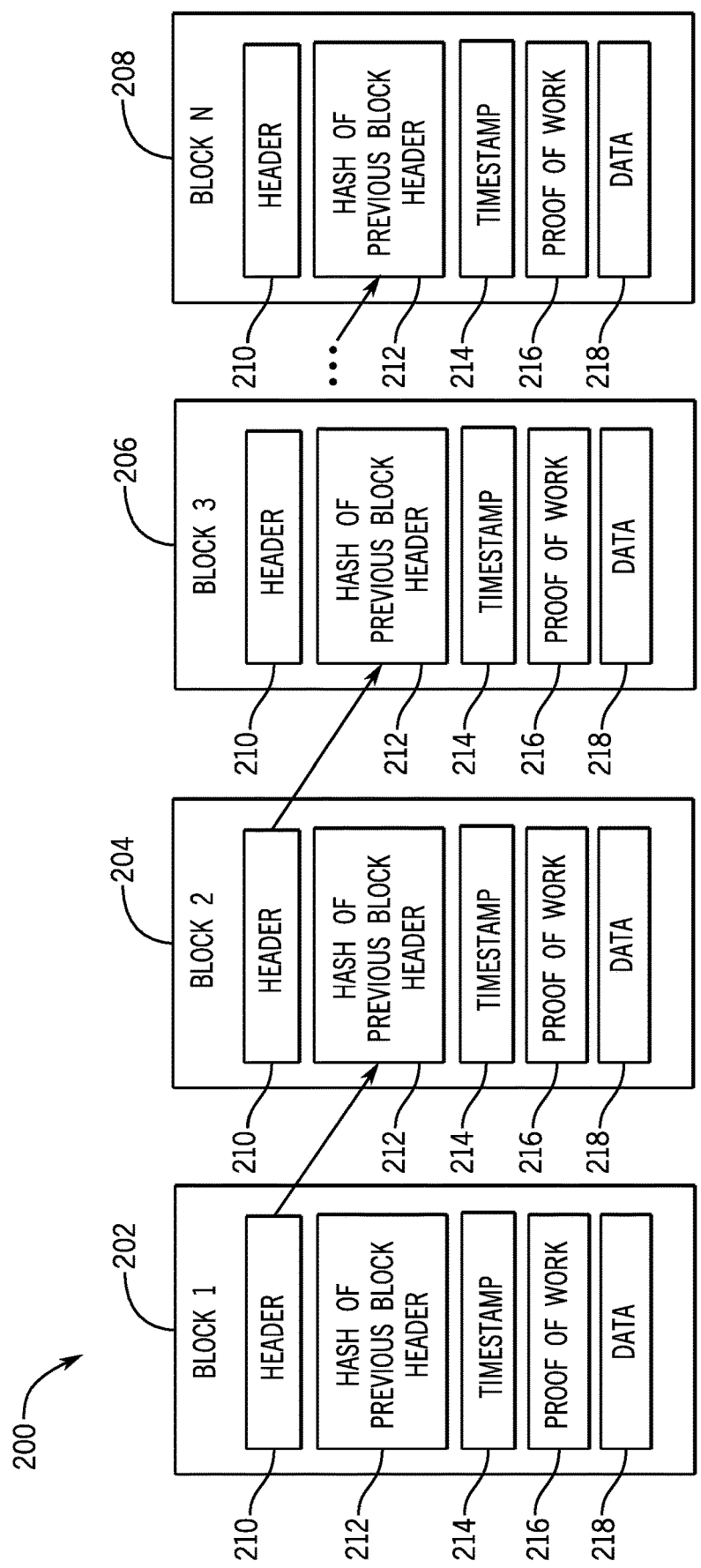
FIG. 2 illustrates a block diagram of an embodiment of a blockchain, according to aspects of the present disclosure.

FIG. 2 is a diagram depicting an embodiment of the blockchain 200. In the depicted embodiment, the blockchain 200 is illustrated as having multiple blocks 202, 204, 206, and 208. The block 202 (first block in the blockchain 200) may have been created, for example, and allocated as a special starting block. The block 202 may include a unique header 210 uniquely identifying the block 202 from other blocks in the blockchain 200. Because the block 202 is the first block in the blockchain 200, a hash of a previous block header 212 may be set to zero. A timestamp 214 may include the date of creation for the block 202, and a proof of work section 216 may include certain "work" that proves that a "miner" has performed work suitable for the creation of the block 202 and/or to verify transactions in the blockchain 200. The work section 216 may vary based on a protocol used to create the blockchain 200. For example, a bitcoin protocol may use a Merkle tree. The Merkle tree may be a tree data structure in which every leaf node is labelled with a hash (e.g., one-way hash) of a data block and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is known from our verified blockchain 200, and so on, down the tree. In other words, there's no way to create a fake value that would hash to our expected Merkle tree value (e.g., value stored in section 216 of the block 202), thus creating a single value that proves the integrity of all of the transactions under it.

Data, such as trail records 104-108 and/or the entity verification records 109, may be stored in a section 218 (and/or in another section). In certain embodiments, a new block may be created when a new record for any of the trails 104-108 and/or the entity verification records 109 is to be created. For example, a new mortgage physical asset record 114 may result in the creation of a new block, which may be tied in via block ID to existing block(s) (e.g., storing entity verification record(s) 106). In another embodiment, empty blocks may be first created and then assigned to new records for the trail records 104-108 and/or the entity verification records 109. When a new block is created, the block will receive a new header 210 uniquely identifying the new block. As mentioned earlier, a peer-to-peer network may include multiple "miners" (e.g., computing devices 138) that add blocks to the blockchain 200 based on the blockchain protocol. In general, multiple miners validate transactions or data 218 that are to be added to a block, and compete (e.g., perform computing work, as introduced above) to have their respective block added to the blockchain 200. Validation of transactions and/or data includes verifying digital signatures associated with respective transactions and/or data 218. For a block to be added to the blockchain 200, a miner must demonstrate a proof of work before their proposed block of transactions is accepted by the peer-to-peer network, and before the block is added to the blockchain 200. In certain embodiments, a blockchain protocol includes a proof of work scheme (e.g., Merkle Tree) that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value such that the output hash value cannot be 'un-hashed' to determine what the input was. The blockchain protocol can require multiple pieces of information as input to the CHF. For example, the input to the CHF can include a reference to the previous (most recent) block (e.g., hash 150) in the blockchain 200, details of the transaction(s) or data 218 that are to be included in the to be created block, and a "nonce" value (e.g., a random number used only once).

Multiple nodes may compete to hash a set of transactions and to provide the next block that is to be added to the blockchain 200. The blockchain protocol may provides a threshold hash to qualify a block to be added to the blockchain 200. For example, the threshold hash can include a predefined number of zeros (0's) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain 200. Each miner provides the reference to the previous (most recent) block in the blockchain 200, details of the data or transaction(s) 218 that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. If the hash value meets the threshold hash (e.g., at least the first four characters of the hash value are each zero), the respective miner may have successfully created the next block that is to be added to the blockchain 200. Consequently, the respective miner's block is broadcast across the peer-to-peer network (e.g., all devices 138 communicatively coupled to the system 102). All other miners cease work (because one miner was already successful), and all copies of the blockchain 200 are updated across the peer-to-peer network to append the block to the blockchain 200. Each miner produces hundreds of thousands (or more) of hash values, before any one miner provides a qualifying hash value (e.g., at least the first four characters of the hash value are each zero).

It is to be noted that any computing device, such as devices 138 may be miners. Accordingly, as new trail records 104-108 and/or the entity verification records 109 are created, new blocks are added to the blockchain 200, including blocks 202, 204, 206, and 208. Indeed, the blockchain 200 may continue to grow, storing new records for the trails 104-108, and entity verification records 109. Because of the distributed nature of the peer-to-peer network created via the distributed ledger system 102, each node (e.g., computing devices 138) may include copies of the blockchain 200 and share copies of the blockchain 200 as new peers enter the peer-to-peer network. Each copy of the blockchain 200 may include verified information (e.g., records for the trail records 104-108 and/or the entity verification records 109) for all or substantially all of the information tracked by the distributed ledger system 102. The information is secure, immutable, and more efficiently tracked as new assets get added via the distributed ledger system 102. Accordingly, relationships, transactions, or information between entities may be captured, as shown in FIG. 3.

Figure 3:
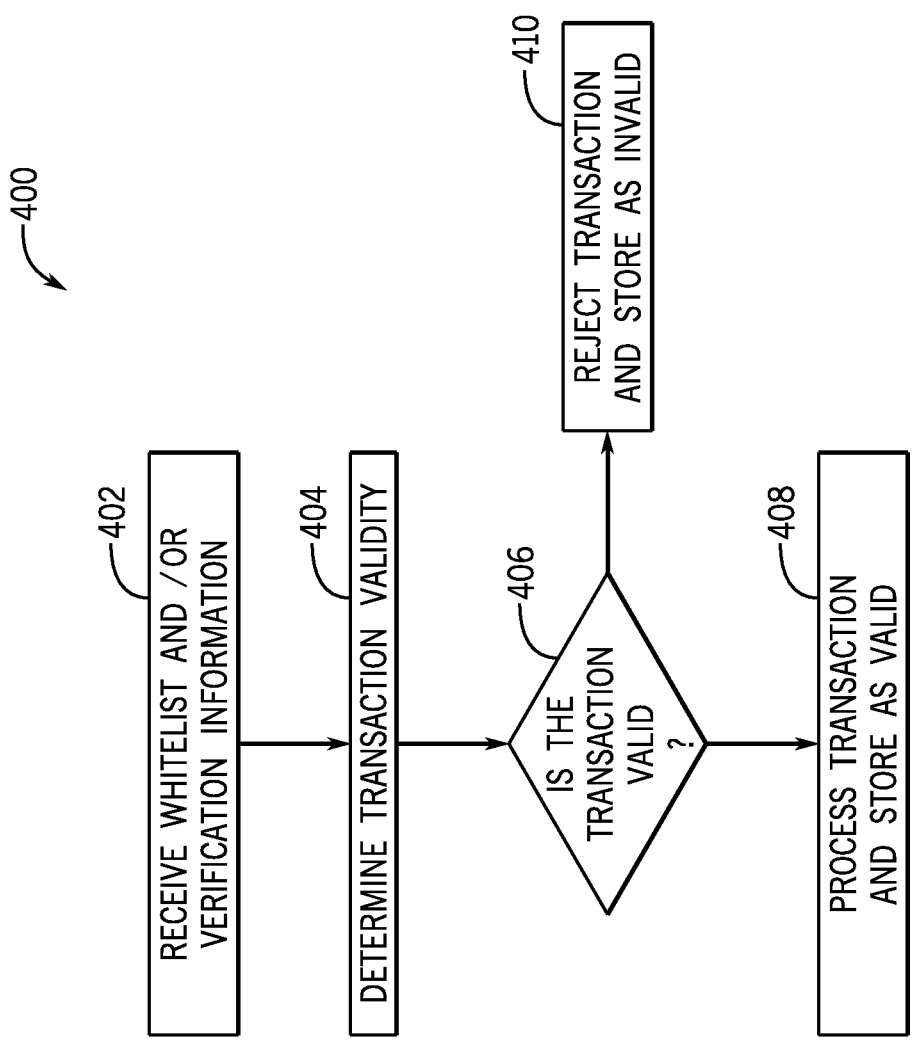
FIG. 3 is a flowchart depicting an embodiment of a process for the verification of certain transactions, according to aspects of the present disclosure.

FIG. 3 is a flowchart depicting an embodiment of a process 400 for the verification of certain transaction records 108 based on the whitelist trail records 104 and/or verification trail records 106. The process 400 may be implemented as computer code or instructions executable, for example, by the computing devices 138. In the depicted embodiment, the process 400 may receive (block 402) certain whitelist trail records 104 and/or verification trail records 106. For example, the applications 140 may be used to transmit whitelist trail records 104 and/or verification trail records 106 for transaction that include a date and a time that are specified to authorize the transaction, a picture verifying that the transaction took place (e.g., picture of a check, picture of a receipt, picture of a doctor's visit document, and so on), and the like. As mentioned earlier, the whitelist trail records 104 and/or verification trail records 106 may be emailed, may be transmitted via wireless techniques (e.g., Bluetooth, Wi-Fi), may be input (e.g., typed in), or a combination thereof. The process 400 may then determine (block 404) the validity of the transaction(s). For example, a whitelist record 104 may be created that stores desired dates and/or times for use of a credit card. In response to the credit card transaction occurring within the desired date and/or time, the transaction would be considered valid. Transactions occurring outside of the whitelisted dates and/or times may be considered invalid. Likewise, a check may only be considered valid in response to a verification record 106 that including a picture or image of the same check being communicated to the bank. Any number of whitelist trail records 104 and/or verification trail records 106 may be used, including dates, times, pictures, purchase types (e.g., goods or services that may be purchased, or that may not be purchased), purchase amounts, or a combination thereof.

If it is determined (decision 406) that a transaction is valid based on the whitelist trail records 104 and/or verification trail records 106, the transaction may be processed (block 408). That is, the transaction may be processed to move funds, withdraw funds, record a credit, record a debit, and so on. The transaction may then be recorded as a valid transaction and linked to the whitelist trail records 104 and/or verification trail records 106. If it is determined (block 408), that the transaction is not valid based on the whitelist trail records 104 and/or verification trail records 106, the transaction may be denied (block 410). That is, the transaction may be rejected and the reasons for the rejection presented to the first entity 112 and/or to the counterparty entity 116. For example, text messages, emails, voice calls, and so on, may be used to communicate to the first entity 112 and/or to the counterparty entity 116 that the transaction did not go through. The transaction may then be stored as a rejected or invalid transaction. By using whitelist trail records 104 and/or verification trail records 106 to validate transactions, the techniques described herein may provide for more secure and efficient transaction processing, and when using the distributed ledger 102, the ledger 102 may provide for an immutable information history of transaction validity processing.

FIG. 4 depicts an example computing system, according to implementations of the present disclosure. The system 500 may be used for any of the operations described with respect to the various implementations discussed herein. For example, the system 500 may be included, at least in part, in one or more of the user device(s) 138, the node(s) that host the distributed ledger 102, and/or other computing device(s) or system(s) described herein. The system 500 may include one or more processors 510, a memory 520, one or more storage devices 530, and one or more input/output (I/O) devices 550 controllable via one or more I/O interfaces 540. The various components 510, 520, 530, 540, or 550 may be interconnected via at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. For example, the processor(s) 510 may execute instructions for the various software module(s) described herein. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500 or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more communication networks using any network protocol.

Computing devices of the system 500 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices 138 of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code), such as one or more programs used to implement the process 400, may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random-access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A system, comprising:
a processor; and
a memory communicatively coupled to the processor, the memory storing instructions which, when executed, cause the processor to perform operations comprising:
receiving information indicative of a date, a time, a purchase type, and an amount associated with performing a transaction from a plurality of transacting parties;
generating a whitelist record comprising the information;
identifying a blockchain of a distributed ledger system associated with a first transacting party of the plurality of transacting parties, wherein the blockchain is accessible by the first transacting party;
storing the whitelist record in a first sidechain associated with the blockchain, wherein the first sidechain comprises only the whitelist record;
receiving a transaction request to perform a sale operation, a property transfer, a payment operation, or any combination thereof from a second transacting party of the plurality of transacting parties;
receiving the whitelist record from the first sidechain associated with the blockchain stored on the distributed ledger system;
receiving a verification record from a second sidechain associated with the blockchain stored on the distributed ledger system;
determining whether the transaction request is valid based on the transaction request being received on the date and the time indicated in the whitelist record and the verification record, wherein the transaction request corresponds to the purchase type and the amount in the whitelist record, and wherein the verification record comprises an image representative of an object related to the transaction;
processing the transaction in response to the transaction request being valid based on the whitelist record and the verification record; and
adding an entry to a third sidechain comprising a transaction record in response to the transaction being processed, wherein the entry comprises a link to the whitelist record, wherein the third sidechain is associated with a main block in the blockchain, and wherein the third sidechain is accessible by the first transacting party and the second transacting party.

2. The system of claim 1, wherein the operations comprise storing in the blockchain or an additional blockchain of the distributed ledger system an entity verification record that verifies an identity of at least one of the second transacting party or a counterparty entity in the transaction.

3. The system of claim 1, wherein the distributed ledger system immutably stores data via a peer-to-peer network.

4. The system of claim 1, wherein determining whether the transaction request is valid comprises comparing the date, the time, the purchase type, or the amount associated with performing the transaction to a transaction occurrence date, a transaction occurrence time, a transaction purchase type, or a transaction amount to determine whether the transaction occurrence date, the transaction occurrence time, the transaction purchase type, or the transaction amount corresponds to the date, the time, the purchase type, or the amount associated with performing the transaction.

5. The system of claim 1, wherein the object comprises a check, a sales receipt, a warranty deed, an insurance document, a banking document, a health records document, or a combination thereof.

6. The system of claim 1, wherein processing the transaction comprises moving funds, creating a debit, creating a credit, transferring property, or a combination thereof via the distributed ledger system.

7. A method performed by at least one processor, the method comprising:
receiving, via the at least one processor, information indicative of a date, a time, a purchase type, and an amount associated with performing a transaction from at least one transacting party;
generating, via the at least one processor, a whitelist record comprising the information;
identifying, via the at least one processor, a blockchain of a distributed ledger system associated with the at least one transacting party;
storing, via the at least one processor, the whitelist record in a first sidechain associated with the blockchain, wherein the first sidechain comprises only the whitelist record;
receiving, via the at least one processor, a transaction request to perform a sale operation, a property transfer, a payment operation, or any combination thereof from the at least one transacting party;
receiving, via the at least one processor, the whitelist record from the first sidechain associated with the blockchain stored on the distributed ledger system;
receiving, via the at least one processor, a verification record from a second sidechain associated with the blockchain stored on the distributed ledger system;
determining, via the at least one processor, whether the transaction request is valid based on the transaction request being received on the date and the time indicated in the whitelist record and the verification record, wherein the transaction request corresponds to the purchase type and the amount in the whitelist record, and wherein the verification record comprises an image representative of an object related to the transaction;
processing, via the at least one processor, the transaction in response to the transaction request being valid based on the whitelist record and the verification record; and
adding, via the at least one processor, an entry to a third sidechain comprising a transaction record in response to the transaction being processed, wherein the entry comprises a link to the whitelist record, and wherein the third sidechain is associated with a main block in the blockchain.

8. The method of claim 7, comprising receiving, via the distributed ledger system, an audit trail for valid transactions, for rejected transactions, or for a combination thereof.

9. The method of claim 7, wherein determining whether the transaction request is valid comprises comparing the date, the time, the purchase type, or the amount associated with performing the transaction to a transaction occurrence date, a transaction occurrence time, a transaction purchase type, or a transaction amount to determine whether the transaction occurrence date, the transaction occurrence time, the transaction purchase type, or the transaction amount corresponds to the date, the time, the purchase type, or the amount associated with performing the transaction.

10. The method of claim 7, wherein the object comprises a check, a sales receipt, a warranty deed, an insurance document, a banking document, a health records document, or a combination hereof.

11. One or more non-transitory computer-readable storage media storing instructions which, when executed, cause at least one processor to perform operations comprising:
receiving information indicative of a date, a time, a purchase type, and an amount associated with performing a transaction from a plurality of transacting parties;
generating a whitelist record comprising the information;
identifying a blockchain of a distributed ledger system associated with a first transacting party of the plurality of transacting parties, wherein the blockchain is accessible by the first transacting party;
storing the whitelist record in a first sidechain associated with the blockchain, wherein the first sidechain comprises only the whitelist record;
receiving a transaction request to perform a sale operation, a property transfer, a payment operation, or any combination thereof from a second transacting party of the plurality of transacting parties;
receiving the whitelist record from the first sidechain associated with the blockchain stored on the distributed ledger system;
receiving a verification record from a second sidechain associated with the blockchain stored on the distributed ledger system;
determining whether the transaction request is valid based on the transaction request being received on the date and the time indicated in the whitelist record and the verification record, wherein the transaction request corresponds to the purchase type and the amount in the whitelist record, and the verification record comprises an image representative of an object related to the transaction;
processing the transaction in response to the transaction request being valid based on the whitelist record; and
adding an entry to a third sidechain comprising a transaction record in response to the transaction being processed, wherein the entry comprises a link to the whitelist record, and wherein the third sidechain is accessible by the first transacting party and the second transacting party and associated with a main block in the blockchain.

12. The one or more non-transitory computer-readable storage media of claim 11, wherein determining whether the transaction request is valid comprises comparing the date, the time, the purchase type, or the amount associated with performing a transaction to a transaction occurrence date, a transaction occurrence time, a transaction type, or a transaction amount to determine whether the transaction occurrence date, the transaction occurrence time, the transaction type, or the transaction amount corresponds to the date, the time, the purchase type, or the amount associated with performing a transaction.

13. The one or more non-transitory computer-readable storage media of claim 11, wherein the object comprises a check, a sales receipt, a warranty deed, an insurance document, a banking document, a health records document, or a combination hereof.

14. The one or more non-transitory computer-readable storage media of claim 11, wherein the instructions cause the processor to perform operations comprising receiving, via the distributed ledger system, an audit trail for valid transactions, for rejected transactions, or for a combination thereof.

15. The method of claim 7, wherein the entry to the third sidechain comprises an additional link to the verification record.

16. The one or more non-transitory computer-readable storage media of claim 11, wherein the entry to the third sidechain comprises an additional link to the verification record.

* * * * *